(12) United States Patent
Jannic

(10) Patent No.: US 7,695,804 B2
(45) Date of Patent: Apr. 13, 2010

(54) HEAT-ACTIVATABLE ADHESIVE

(75) Inventor: Patrice Jannic, Rueil-Malmaison (FR)

(73) Assignee: 3M Innovative Properties Company, St. Paul, MN (US)

( * ) Notice: Subject to any disclaimer, the term of this patent is extended or adjusted under 35 U.S.C. 154(b) by 691 days.

(21) Appl. No.: 10/551,594

(22) PCT Filed: Mar. 19, 2004

(86) PCT No.: PCT/US2004/008523

§ 371 (c)(1),
(2), (4) Date: Sep. 30, 2005

(87) PCT Pub. No.: WO2004/094550

PCT Pub. Date: Nov. 4, 2004

(65) Prior Publication Data

US 2006/0188709 A1    Aug. 24, 2006

(51) Int. Cl.
  *B32B 7/12* (2006.01)
(52) U.S. Cl. .................. 428/212; 428/220; 428/343; 525/144; 525/145
(58) Field of Classification Search ............. 428/212, 428/220, 343; 525/145, 144
See application file for complete search history.

(56) References Cited

U.S. PATENT DOCUMENTS

| | | | |
|---|---|---|---|
| 2,425,348 A | | 8/1947 | Schroeder |
| 2,839,443 A | * | 6/1958 | Fleming ................. 442/149 |
| 3,475,213 A | | 10/1969 | Stow |
| 4,668,565 A | | 5/1987 | Murachi |
| 4,699,832 A | | 10/1987 | Sattelmeyer |
| 5,385,979 A | * | 1/1995 | Ozawa et al. .............. 525/145 |
| 5,672,400 A | | 9/1997 | Hansen et al. |
| 5,905,099 A | | 5/1999 | Everaerts et al. |
| 6,500,891 B1 | * | 12/2002 | Kropp et al. ............... 524/430 |
| 6,646,350 B2 | | 11/2003 | Tanaka et al. |
| 6,884,833 B2 | | 4/2005 | Chheang et al. |
| 6,888,257 B2 | | 5/2005 | Wilson et al. |

FOREIGN PATENT DOCUMENTS

| | | |
|---|---|---|
| CA | 452 052 | 10/1948 |
| DE | 44 27 802 C1 | 10/1995 |
| EP | 0 004 402 B1 | 10/1982 |
| EP | 0 691 660 A1 | 1/1996 |
| EP | 1 026 217 A1 | 8/2000 |
| EP | 0 937 315 B1 | 9/2001 |
| EP | 1 219 693 A1 | 7/2002 |
| GB | 1 498 453 | 1/1978 |
| JP | 62-263271 | 11/1987 |
| JP | 63-139967 | 11/1998 |
| JP | 2002-198473 | 7/2002 |
| WO | WO 99/67088 | 12/1999 |
| WO | WO 00/01782 | 1/2000 |
| WO | WO 01/64807 A1 | 9/2001 |
| WO | WO 01/85358 A1 | 11/2001 |
| WO | WO 02/067315 A2 | 8/2002 |

OTHER PUBLICATIONS

Lyons et al., Electrically Conductive Adhesives, pp. 565-584, Feb. 21, 2006.

* cited by examiner

*Primary Examiner*—David R Sample
*Assistant Examiner*—Lawrence D Ferguson
(74) *Attorney, Agent, or Firm*—Dean M. Harris; Stephen F. Wolf

(57) ABSTRACT

A heat-activatable adhesive comprising from about 30 to about 70 wt. % of one or more elastomers, from about 20 to about 60 wt. % of one or more novolac phenolic resins, and an effective amount of one or more crosslinking agents capable of effecting crosslinking of the one or more novolac phenolic resins, wherein the ratio of the mass of the one or more novolac phenolic resins over the mass of the one or more elastomers is at least about 0.65.

11 Claims, No Drawings

HEAT-ACTIVATABLE ADHESIVE

FIELD OF THE INVENTION

The present invention relates to heat-activatable adhesives comprising one or more elastomers and one or more phenolic resins. The present invention also relates to an assembly comprising an electronic element bonded to a polymeric substrate wherein bonding is effected by said heat-activatable adhesive.

BACKGROUND OF THE INVENTION

Assemblies comprising electronic elements such as flexible, partially flexible or rigid electronic circuits or integrated circuits which are positioned in a recess of a polymeric carrier substrate such as a polymeric card, are widely used, for example, in the form of credit cards, cash cards, smart cards, telephone cards or identification cards such as radio frequency identification (RFID) tags. The electronic carrier elements have been bonded to the polymeric carrier substrate by means of structural adhesives which are desired for high bond strength and tamper resistance, but which are usually brittle and do not provide the durability and flexibility required during usage of credit cards, smart cards and similar assemblies.

A heat-activatable adhesive film for use with a data storage medium has been described with an integrated circuit element arranged in a recess of the body of a card. The exemplified film comprises nitrile rubber, phenolic resin and zinc oxide. This adhesive resin tends to be too brittle and not sufficiently flexible for many applications.

An electronically conductive, thermoplastic and heat-activatable adhesive sheet has been described to contain a thermoplastic polymer in a proportion of at least 30 weight percent (wt. %), one or more tackifying resins in a proportion from 5-50 wt. %, and/or epoxy resins with hardeners in a proportion of from 5-40 wt. %, as well as metalized particles in a proportion of from 0.1-40 wt %, and from 1-10 wt. % non-deformable or virtually non-deformable spacer particles. The exemplified adhesive sheet contains nitrile rubber, phenolic resin, glass beads and gold-coated polystyrene beads.

Also known are electrically conductive, thermoplastic and heat-activatable adhesive films. Such known heat-activatable adhesive films tend not to be sufficiently flexible for demanding applications such as credit cards, identification cards, or smart cards.

BRIEF DESCRIPTION OF THE INVENTION

It was therefore an object of the present invention to provide a heat-activatable adhesive and adhesive film which allows for the preparation of bonds between electronic elements and substrates having a higher flexibility. It was another object of the present invention to provide a heat-activatable adhesive and adhesive film which can be reliably used in demanding bonding applications such as, for example, in credit cards or smart cards over a prolonged period of time. Other objects of the present invention will be apparent from the following detailed specification.

The present invention relates to a heat-activatable adhesive comprising from about 30 to about 70 weight percent (wt. %) of one or more elastomers, from about 20 to about 60 wt. % of one or more novolac phenolic resins, and an effective amount of one or more crosslinking agents capable of effecting crosslinking of the one or more novolac phenolic resins, wherein the ratio of the mass of the one or more novolac phenolic resins over the mass of the one or more elastomers is at least about 0.65, and wherein the heat-activatable adhesive has upon curing a glass transition temperature of less than about 60° C.

The glass transition temperature ($T_g$) is measured at a rate of 2° C./min over a temperature range from −100° C. to 200° C. Curing is effected by placing the heat-activatable adhesive in a forced air oven at an elevated temperature for a time sufficient to cure the adhesive, e.g., at 150° C. for one minute, removing it from the oven and transferring it to an ambient temperature environment where it is allowed to cool to room temperature.

The present invention furthermore relates to an assembly comprising an electronic element attached to a substrate (e.g., a polymeric material) by means of a bond comprising the heat-activatable adhesive according to the invention. This bond optionally is functionally maintained for at least about 200 Flexural Cycles. The term "Flexural Cycle" as used above and below means one set of bends in each of four modes: one up and one down in the length (x-direction) of an industry standard sample smart card (having dimensions of about 8.5 cm length, about 5.4 cm width, and about 0.8 mm thickness), and one up and one down in the width (y-direction) of the same sample card. As used herein, "functionally maintained" means that the electronic element and the substrate remain bonded.

DETAILED DESCRIPTION OF THE INVENTION

All numbers are herein assumed to be modified by the term "about". The recitation of numerical ranges by endpoints includes all numbers subsumed within that range (e.g., 1 to 5 includes 1, 1.5, 2, 2.75, 3, 3.80, 4, and 5).

The heat-activatable adhesive of the present invention comprises one or more elastomers which are preferably selected from a group comprising natural and synthetic rubbers, butyl rubber, nitrile rubbers, synthetic polyisoprene, ethylene-propylene rubber, ethylene-propylene-diene monomer rubber (EPDM), polybutadiene, polyisobutylene, poly (alpha-olefin), styrene-butadiene random copolymer, fluoroelastomers, silicone elastomers, and combinations thereof. Such elastomers include poly(butadiene-co-acrylonitrile) copolymers such as nitrile butadiene rubbers which are especially preferred.

The heat-activatable adhesive of the present invention preferably comprises between about 30 and about 70 wt. %, more preferably between about 35 and about 65 wt. % and especially preferably between 37.5-60 wt. % of one or more elastomers. In one aspect, the heat-activatable adhesive preferably comprises between 1-3 and more preferably 1 or 2 elastomers.

The heat-activatable adhesive of the present invention furthermore comprises one or more novolac phenolic resins.

Phenolic resins comprise resole phenolic resins and novolac phenolic resins. Resole phenolic resins may be formed by the reaction of phenol or substituted phenols with an excess of formaldehyde in the presence of a basic catalyst. The use of resole phenolic resins tends to result in heat-activatable adhesives which do not have a sufficient flexibility and are too brittle for many applications. Without wishing to be bound by this reasoning, it is speculated that the disadvantageous properties of heat-activatable adhesives comprising resole type phenolic resins are due to the high amount of hydroxyl and hydroxyethyl aromatic substituent groups resulting in excessive crosslinking. Another disadvantage of resole type phenolic resins is the evolution of water during cure which may result in porous, sponge-like layers of the corresponding heat-activated adhesive having an insufficient mechanical strength.

Although known adhesive descriptions may fail to specify the type of the phenolic resin included in the heat-activatable adhesive, the adhesives tend to be brittle and inflexible and unsuitable for newer, more demanding applications. Thus, it is recognized in the present invention that resole type phenolic resin may be included in heat-activatable adhesives with advantageous properties in a low amount so as to not undesirably reduce the flexibility and/or durability in an application including a bond comprising the adhesive of the present invention. In one embodiment, the resole type phenolic resin(s) may be included in amounts of less than 5 wt. %, more preferably of less than 2 wt. % and particularly preferably of less than 1 wt. %. In other aspects, especially preferred are heat-activatable adhesives comprising no resole-type phenolic resin.

The heat-activatable adhesives of the present invention comprise one or more novolac type phenolic resins in an amount of about 20 to about 60 wt. %, more preferably of 30-55 wt. % and especially preferably of from 35-50 wt. %.

Novolac phenolic resin may be obtained by reacting an excess of phenol or substituted phenols such as, for example, resorcinol, para-substituted phenol such as p-tert-butyl phenol or cresol with formaldehyde in the presence of an acidic catalyst. Preferred novolac resin precursors include unsubstituted phenol and para-substituted phenols with unsubstituted phenol being specifically preferred. Novolac phenolic resins are commercially available, for example, as Bakelite™ resin from Bakelite AG, Iserlohn-Lethmathe, Germany. Novolac phenolic resins having a low content of free phenol of less than about 1 wt. %, more preferably of less than about 0.5 wt. % and in other aspects especially preferably of less than about 0.25 wt. % with respect to the mass of the novolac phenolic resin are preferred. Higher amounts of free phenol tend to increase the glass transition temperature of the heat-activated adhesive to an undesirable extent.

In one aspect, the heat-activatable adhesive of the present invention comprises between 1-3 and more preferably 1 or 2 novolac phenolic resins.

The heat-activatable adhesive of the present invention furthermore comprises an effective amount of one or more crosslinking agents capable of effecting crosslinking of the one or more novolac phenolic resins. A preferred crosslinking agent is hexamethylenetetramine (HMTA). The HMTA content preferably ranges from about 5 to about 15 wt. % and more preferably from about 6 to about 12 wt. % with respect to the mass of the novolac phenolic resin or resins. Novolac phenolic resins which are commercially available often already include HMTA and/or another crosslinking agent which has to be taken into account when adjusting the level of the crosslinking agent in view of the above preferred ranges.

The adhesives according to the present invention are "heat-activatable". This means above and below that the novolac phenolic resin or resins of the heat-activatable adhesive of the present invention are not crosslinked or crosslinked to a low degree only so that they are still thermoformable. When using HMTA as a crosslinking agent, crosslinking is effected at elevated temperatures of typically at least about 140° C., more preferably at least about 150° C. The upper end of the crosslinking temperature range is below about 200° C. Crosslinking of the novolac resin or resins proceeds at a high reaction speed so that the heat-activatable adhesive needs to be kept at such elevated temperatures for short times of typically less than about several minutes, more preferably less than about one min, even more preferably of less than 50 sec and especially preferably of less than 30 sec only. This curing behavior allows use of the heat-activatable adhesive of the present invention with temperature-sensitive substrates such as polymer cards without damaging such substrates.

The heat-activatable adhesives of the present invention furthermore are usually solid and, optionally, essentially tack-free at room temperature. The heat-activatable adhesives of the present invention are usually provided as adhesive sheets or films preferably having a thickness of between about 30 and about 200 µm and more preferably of between about 40 and about 100 µm. Prior to bonding such heat-activatable adhesive sheets may be die-cut to form punched sections having a form and size corresponding, for example, to the bonding area between the electronic element and the substrate it is bonded to. Sheets of the heat-activatable adhesive can be obtained by dissolving it in a suitable solvent such as methyl ethyl ketone and coating the resulting solution on a liner with subsequent drying.

The following procedure which can be used for bonding, for example, a fully operational microprocessor such as an integrated circuit chip into a correspondingly shaped recess on a polymeric card made, for example, from conventional chip card materials such as PVC, PC, PET, or ABS, illustrates typical processing and crosslinking parameters for the heat-activatable adhesive of the present invention. Such specific method involves Model ENC 3000 G4 automatic module bonding equipment available from Datacard (Semoy, France). Process parameters for bonding of fully operational microprocessors to polymeric cards using automatic equipment include a pretack temperature sufficiently elevated to render the heat-activatable adhesive tacky, e.g., from about 100° C. to about 200° C., a pretack pressure sufficient to adhere the microprocessor to the card, e.g., from about 0.5 bar to about 12 bar, and holding the pretack temperature/pressure conditions for a duration of about 1 to about 10 seconds (more preferably from about 1.5 to about 5 seconds). Further parameters include a bonding head temperature of about 180° C. to about 220° C. whereby the person skilled in the art can select particularly preferred temperatures by quick and a limited amount of experiments. In addition, the automatic bonding equipment mentioned above also can use recess preheating (pulse air temperature) from about 0° C. to about 200° C., a heating force of about 50 Newtons (N) to about 100 N (more preferably from about 60 N to about 80 N) with the heating force being held for about 1 to about 10 seconds (more preferably from about 3 to about 7 seconds), and optional (although preferred) cooling at a temperature preferably below ambient and more preferably below about 20° C.

The heat-activated adhesive of the present invention comprises a three-dimensional network of the novolac phenolic resin or resins which provides a high mechanical strength, and permanently elastic elastomers providing a high flexibility and avoiding brittleness thus allowing the heat-activated adhesive to allow for multiple flexing operations over a prolonged period of time.

It is recognized in the present invention that the ratio of the mass weight of the one or more novolac phenolic resins over the mass weight of the one or more elastomers should be controlled to provide a desirable or even optimum balance of strength and flexibility. The ratio of the mass weight of the one or more novolac phenolic resins to the mass weight of the one or more elastomers is at least about 0.65, preferably between 0.65 and 1.0, more preferably between 0.70 and 0.90 and especially preferably between 0.75 and 0.85. If the ratio of the mass weight of the one or more novolac phenolic resins to the mass weight of the one or more elastomers is less than 0.65, the heat-activated adhesive tends to exhibit unfavourably high values of elasticity and toughness which adversely affect the desired high flexibility of the cured bond. If such ratio is above 1.0, the heat-activated adhesive tends to be characterized by an unfavourably high brittleness and low toughness.

The heat-activated, i.e., cured, adhesive of the present invention has a glass transition temperature ($T_g$) of less than about 60° C., more preferably of less than 55° C. and in some aspects especially preferably of less than 50° C. The glass transition temperature can be measured by using conventional equipment such as, for example, the Dynamic Mechanical Thermal Analyzer V available from Rheometric Scientific, Inc., Piscataway, N.J., using a heating rate of 2° C./min over a temperature range from −100° C. to 200° C. Curing is effected prior to such measurement by holding the heat-activatable adhesive at an elevated temperature for a short time, e.g., a temperature of about 150° C. in a forced air oven for about one minute, then removing it from such oven and transferring it to an ambient temperature atmosphere where it is allowed to cool to ambient temperature. This $T_g$ of the heat-activated, cured adhesive of the present invention preferably deviates from the $T_g$ of the heat-activatable, non-cured adhesive of the present invention as measured via the same method in the virgin temperature cycle of between −100° C. and 200° C., by less than about 15° C., more preferably by less than 10° C. and in some aspects especially preferably by less than 5° C. Details of the $T_g$ measurements are given in the experimental section below.

It was found in the present invention that the absolute value of the $T_g$ and/or the difference of the glass transition temperatures of the heat-activated and heat-activatable adhesive of the present invention, respectively, tend to be below the values specified above if the heat-activatable adhesive comprises one or more vulcanization agents capable of crosslinking the one or more elastomers in an amount of less than about 0.25 wt. % and/or one or more crosslinking agents capable of effecting a crosslinking reaction between the one or more elastomers and the one or more novolac phenolic resins in an amount of less than about 0.25 wt. %. Typical vulcanization agents include sulphur or sulphur containing compounds such as, for example, mercaptobenzothiazole and N-cyclohexyl-2 benzothiazolesulfenamide. ZnO is a typical crosslinking agent capable of crosslinking the one or more elastomers with the one or more novolac resins.

The amount of such vulcanization agents and crosslinking agents each preferably is independently from each other less than about 0.20 wt. %, more preferably less than 0.10 wt. %. In some aspects, such vulcanization agents and crosslinking agents are especially preferably minimized or even omitted.

The heat-activatable adhesive of the present invention may comprise additional thermoplastic polymers in an amount not adversely affecting the advantageous properties of the heat-activated adhesive to an unacceptable amount. Suitable thermoplastics include polyesters and copolymers thereof, polyamides, co-polyamides, polyether-co-polyamides, polyester-co-polyamides, and combinations thereof.

The heat-activatable adhesive may also include tackifiers such as rosin and rosin derivatives, polyterpenes, coumarone indenes, aromatic hydrocarbon resins, aliphatic hydrocarbon resins, hydrogenated resins and hydrocarbon resins, for example: alpha pinene-based resins, beta pinene-based resins, limonene-based resins, piperylene-based hydrocarbon resins, esters of rosins, polyterpene, terpene-phenolics, and styrene-maleic anhydrides.

The heat-activatable adhesive may also include further additives such as fillers, electrically conductive particles, thermally conductive particles, spacer particles, anti-oxidants, UV-stabilizers, corrosion inhibitors or reinforcing materials. An especially preferred additive is represented by elongated electrically conductive particles which are disclosed in U.S. patent application Ser. No. 10/411,163, filed on Apr. 10, 2003.

The total amount of additional non-curable thermoplastic adhesives and any further additives preferably is less than about 40 wt. %, more preferably less than 30 wt. % and especially preferably less than 25 wt. %. The total amount of the additional non-curable thermoplastic resin preferably is less than about 20 wt. % and more preferably less than 10 wt. %.

The present invention also includes an assembly comprising an electronic element attached to a substrate by a bond comprising the heat-activated adhesive of the present invention. Any known electronic element such as, for example, fully operational microprocessors, integrated circuit chips, or radio frequency identification (RFID) tags may be used.

The substrate may be, for example, a polymeric card such as a smart card comprising a recess into which the electronic element is inserted. The polymeric cards may be made of any conventional chip card material such as, for example, PVC, PC, PET or ABS. Card blanks can be, for example, a combination card having a built-in antenna.

The examples of assemblies given above are to illustrate the invention only without limiting it.

The electronic element is bonded to the substrate by a heat-activated adhesive of the present invention. The heat-activated cured adhesive provides a durable flexible bond which can be assessed by the Flexural Cycle Test described in the test section below.

The durably flexible bond as provided by the heat-activated adhesive of the present invention preferably is functionally maintained for at least about 200 Flexural Cycles, more preferably at least about 500, 1000, 2000, 4000, 5000 or even more Flexural Cycles. In one aspect of the present invention, the assembly remains functional after 1000 Flexural Cycles, which should ensure a device such as a smart card including the heat-activated adhesive of the present invention will function over several years of intended use. In another aspect, the electronic assembly remains functional after 4000 Flexural Cycles, which should ensure a device such as a smart card including the heat-activated adhesive of the present invention will function despite mistreatment.

Percentages as used above and below are percentages by weight (wt. %) and refer to the mass of the heat-activatable adhesive unless indicated otherwise.

The present invention will be further described in the following examples which are to illustrate the invention without limiting it.

EXAMPLES

Materials Used:

Elastomer

Nitrile butadiene rubber having a bound acrylonitrile content of 41%, available as BREON™ N41 H80 from Zeon Chemicals (London, UK).

Resins

Novolac Phenolic Resin

Comprising 0.2% by weight free phenol and 9% by weight hexamethylenetetramine (HMTA), available as BAKELITE™ 0222 SP 06 from Bakelite AG (Iserlohn-Letmathe, Germany).

Resole Cresolic Resin

Capillary melting point 60-70° C., low free phenols of <0.9%, available as BAKELITE™ 9954 AB from Bakelite AG.

Resole Phenolic Resin

Capillary melting point 60-70° C., low free phenol of <0.1%, reactivity B stage at 150° C. for about 3 minutes, available as BAKELITE™ 9075 DF from Bakelite AG.

Substituted Resole Phenolic Resin (CAS 25085-50-1), p-t-butylphenol polymer with formaldehyde.

Other

Tackifier—(CAS 8050-31-5) Glycerol esters of rosin acids.

Vulcanizing agent—Elemental sulfur and at least one other sulfur-containing compound selected from mercaptobenzothiazole and N cyclohexyl-2 benzothiazolesulfenamide.

Crosslinker for effecting a crosslinking reaction between the elastomers and the respective resin—zinc oxide.

Test Methods

I. Tests on Adhesive Films

Glass Transition Temperature, $T_g$, ° C.

Dynamic mechanical thermal analysis (DMTA) was employed to indicate the glass transition temperature, $T_g$, in degrees C., of film samples of the heat-activatable, i.e., non-cured and the heat-activated, i.e., cured adhesives, respectively. Curing was effected by holding the respective adhesive sample at a temperature of 150° C. in a forced air oven for 1 minute, removing it and allowing it to cool to room temperature in a room temperature environment. The measurements were performed by heating the cured and non-cured, i.e., virgin sample, respectively, at a rate of 2° C. per minute over a range from −100° C. to 200° C. using a Dynamic Mechanical Thermal Analyzer V available from Rheometric Scientific, Inc., Piscataway, N.J., and thermal transitions were recorded at a frequency of 1 Hertz and a strain of 0.05%. The test was run in tensile mode. The test was run on at least two samples and the average result reported.

II. Tests on Bonded Card—Module Assemblies

A microprocessor module comprising a chip (available as M8-4 from Infineon Technologies, Saint-Denis, France) was bonded to the pre-formed cavity in a smart card blank made of a sheet or laminate having a polyvinylchloride (PVC) surface by the procedure described in industry standards, i.e., at 180° C. and 9 bar ($9 \times 10^5$ Pa) pressure for 5 seconds.

The adhesive films prepared in the examples were used to make a total of 20 bonded cards with each example film.

A. Flexural Cycle Test

The bonded card-module assembly was tested according to test method ISO/ICE 10373 Parts 1-3 using testing equipment available as "Twister" from Datacard (Semoy, France). The test included flexing in four modes at 23° C. The modes were: bending up 20 mm (in the length) followed by returning to the original position and repeating 250 times; bending up 10 mm (in the width) followed by returning to the original position and repeating 250 times; bending down 20 mm (in the length) followed by returning to the original position and repeating 250 times; bending down 10 mm (in the width) followed by returning to the original position and repeating 250 times.

This resulted in 1000 Flexural Cycles. The test was run on a minimum of 20 cards prepared from each example adhesive. The total time required for 1000 Flexural Cycles was about 20 minutes.

"PASS" means that no movement or delamination of the module on any of the test cards could be observed after the 4000 Flexural Cycles (obtained by repeating the 1000 Flexural Cycles described above for a total of 4 times).

"FAIL" means that a change in the module positioning in card cavity or complete separation of module from the card body on more than 10% of the tested cards was visible after 1000 Flexural Cycles were completed.

B. Adhesion of Module to Cards

This is a qualitative test to determine the strength of the card-module bond. Attempts were made to remove the module from the cavity in the card into which the module had been adhered. Samples were rated as follows:

3—Surface of card damaged
2—100% Cohesive failure of the adhesive
1—Mixed adhesive/cohesive failure
0—No adhesion C. Removability of Module from Card This is a qualitative test to determine how easily a module can be removed from a card without damaging the module. This is a qualitative determination of the resistance of the adhesive bond to tampering and was determined using card blanks comprising polyvinylchloride (PVC) and polyethyleneterephthalate (PET), respectively.

Samples were given the following ratings:

3—Adhesive bond was so strong that module was destroyed on attempts to remove it
2—Module could be removed, but only if it was removed very slowly and with great care
1—Intact module was easy to remove with minimum care Example 1

A solution of 55 wt. % of nitrile butadiene rubber having a bound acrylonitrile content of 41%, available as BREON™ N41 H80 from Zeon Chemicals (London UK) and 45 wt. % novolac phenolic resin, comprising 0.2% by weight free phenol and 9% by weight hexamethylenetetramine (HMTA) (available as BAKELITE™ 0222 SP 06 from Bakelite AG, Iserlohn-Letmathe, Germany) was prepared by first dissolving the rubber in methyl ethyl ketone (MEK) and then adding the novolac phenolic resin. After dissolution was completed by mixing, toluene was added so that the solvent ratio was MEK/toluene 80/20 wt. % with respect to the mass of the solvent. Viscosity of the solution was about 5,000-10,000 mPa. sec.

The solution thus prepared was coated onto a release liner comprising a silicone-coated paper using a knife coater so that the coating had a thickness of about 200 μm. The coating was dried using a forced air oven at a minimum temperature effective to remove the solvent of about 60° C. to give a non-tacky film of the heat-activatable adhesive having a thickness of about 60 μm. The film-liner laminate was rolled up. The adhesive composition is summarized in Table 1. The ratio of the mass of the rubber to the mass of the novolac phenolic resin was 45/55 or 0.82.

The glass transition temperature ($T_g$) was measured on the non-tacky heat-activatable adhesive film of Example 1 by the method described under "Test Methods—I. Tests on Adhesive Films" above. The $T_g$ of the adhesive film in its initial (virgin) state was measured as 35° C.

A sample of the heat-activatable adhesive film was cured by placing it in a forced air oven at 150° C. for 1 minute, removing it and allowing it to cool to room temperature. The glass transition temperature of the heat-activated adhesive was measured as 37° C.

The heat-activatable adhesive film was then employed to adhere microprocessor modules into a cavity on a smart card made of PVC. PVC card blanks were obtained from Sagem (Paris, France) and modules were obtained as M8-4 (as described above). The modules were bonded to the PVC cards using the heat-activatable adhesive film of Example 1 using Model ENC 3000 G4 automatic module bonding equipment (as described above).

Process parameters for bonding of microprocessors to card blanks using automatic equipment include:
Pretack temperature: 100° C.-150° C.
Pretack pressure: 5.5 Bar (5.5×10$^5$ Pa)
Pretack duration: 1.5 to 4.5 seconds
Bonding head temperature: 190° C.-200° C.
Cavity preheating (pulse air temperature): 0 to 200° C.
Heating force: 62 to 78.5 Newtons for 5-6 seconds
Cooling at 15° C.: continuous Tests were conducted on the completed cards using the test methods described under "Test Methods II. Tests on bonded card/module assemblies" above. The heat-activatable adhesive film of Example 1 produced bonded cards that all passed the flexing test of 4000 Flexural Cycles. Additionally, the adhesive of Example 1 produced a reproducibly firm cured adhesive bond with both PVC and PET surfaces such that the module was anchored in the card cavity in a fashion so that it could not be removed intact.

Test results on the bonded card-module assemblies are summarized in Table 2.

Comparative Examples 1-4

Comparative Examples 1-4 were prepared by first combining the acrylonitrile butadiene elastomer with a vulcanizing agent and blending them on a rubber mill. The rubber was then mixed with the resins (including tackifier if present) and zinc oxide acting as a crosslinking agent for the curing reaction between the resin and the rubber in an extruder. The melted mixture was extruded onto a liner and then calendered to produce a non-tacky film having a thickness of 60 μm.

Adhesive compositions of Comparative Examples 1-4 had a glass transition temperature, $T_g$, of over 100° C. after curing at 150° C. in a forced air oven for 1 minute. These materials employed a vulcanizing agent for the acrylonitrile butadiene rubber as well as ZnO as a crosslinking agent for enhancing the covalent bonds between the rubber and resin, which both contributed to a high Tg. Adhesive compositions are summarized in Table 1.

Bonded card-module assemblies were prepared using the non-cured adhesive films of Comparative Examples 1-4. Each assembly failed the flexing test and showed poorer adhesion to PVC and PET smart card substrates as compared to the adhesive film of Example 1. Properties of bonded cards are shown in Table 2.

Comparative Examples 5-7

Adhesive films of Comparative Examples 5-7 were prepared in a manner similar to that of Example 1, by dissolving the chemical components set forth in Table 1 in the amounts shown, casting the solution on a release liner and drying in a forced air oven to make films having thickness of about 60 μm.

Comparative Example 5 failed the flexing test and had poorer adhesion to card substrates than Example 1 of the invention. Comparative Examples 6-7 showed insufficient adhesion to card substrates. Test results on bonded card-module assemblies are summarized in Table 2.

TABLE 1

Composition of Adhesives

| Example | Rubber (type, wt. %) | Resin (type, wt. %.) | Other polymer | Vulcan agent | ZnO | $T_g$, ° C., virgin sample | $T_g$, ° C., cured sample* |
|---|---|---|---|---|---|---|---|
| 1 | NBR, 55% | Novolac phenolic, 45% | 0 | 0 | 0 | 35 | 37 |
| C1 | NBR, 29% | Resole phenolic, 69% | 0 | 0.6% | 1.4% | — | >100 |
| C2 | NBR, 48% | Novolac phenolic, 48% | 0 | 1.5% | 2.5% | — | >100 |
| C3 | NBR, 45.5% | Modified resole phenolic, 30% | Tackifier, 20% | 2% | 2.5% | — | >100 |
| C4 | NBR, 43% | Resole phenolic, 55% | 0 | 0.4% | 1.6% | — | >100 |
| C5 | NBR, 55% | Resole cresolic, 45% | 0 | 0 | 0 | — | — |
| C6 | NBR, 55% | Resole phenolic, 25% | Tackifier, 20% | 0 | 0 | — | — |
| C7 | NBR, 60% | Resole phenolic, 40% | 0 | 0 | 0 | — | — |

*curing conditions = 150° C. for 1 minute, forced air oven
— Test not performed

TABLE 2

Properties of Bonded Card-Module Assemblies

| Example | Flexing Cycle test | Adhesion to PVC | Adhesion to PET | Removability of module (PVC) | Removability of module (PET) |
|---|---|---|---|---|---|
| 1 | Pass | 3 | 3 | 3 | 3 |
| C1 | Fail | 2 | 1 | 2 | 1 |
| C2 | Fail | 2 | 1 | 2 | 1 |
| C3 | Fail | 2 | 1 | 2 | 1 |
| C4 | Fail | 2 | 1 | 2 | 1 |
| C5 | — | 2 | 0 | 1 | 1 |
| C6 | — | 2 | 1 | 2 | 1 |
| C7 | — | 3 | 2 | 2 | 1 |

— Test not performed

The invention claimed is:

1. A heat-activatable adhesive comprising
   (i) from about 30 to about 70 wt. % nitrile butadiene rubber,
   (ii) from about 20 to about 60 wt. % of one or more novolac phenolic resins, and
   (iii) one or more crosslinking agents, in amount of less than about 0.25 wt. %, capable of effecting crosslinking of the one or more novolac phenolic resins,
   wherein the ratio of the mass of the one or more novolac phenolic resins over the mass of the one or more elastomers is at least about 0.65, and
   wherein the heat-activatable adhesive has a glass transition temperature of less than about 60° C.

2. The adhesive according to claim 1 wherein the ratio of the mass of the one or more novolac phenolic resins to the mass of the one or more elastomers is between 0.65 and 1.0.

3. The adhesive according to claim 1 wherein the novolac phenolic resins have a free phenol content of less than 1 wt. % with respect to the mass of the novolac resin.

4. The adhesive according to claim 1 wherein the crossliniking agent comprises hexamethylenetetramine.

5. The adhesive according to claim 1 comprising one or more vulcanization agents capable of crossliniking the one or more elastomers, provided in an amount of less than about 0.25 wt. %.

6. The adhesive according to claim 1 having a crossliniking agent capable of effecting a crossliniking reaction between the one or more elastomers and the one or more novolac phenolic resins, the crossliniking agent(s) provided in an amount of less than about 0.25 wt. %.

7. The adhesive according to claim 1 comprising one or more non-curable thermoplastic resins provided in an amount of less than 20 wt. %.

8. The adhesive according to claim 1 comprising electrically conductive particles.

9. A film comprising the heat-activatable adhesive of claim 1, said film having a thickness of about 30 to about 200 μm.

10. An assembly comprising a bond comprising the heat-activatable adhesive according to claim 1, wherein said bond is capable of being functionally maintained for at least about 200 Flexural Cycles.

11. The assembly of claim 10 further comprising an electronic element.

* * * * *

UNITED STATES PATENT AND TRADEMARK OFFICE
CERTIFICATE OF CORRECTION

| | | |
|---|---|---|
| PATENT NO. | : 7,695,804 B2 | Page 1 of 1 |
| APPLICATION NO. | : 10/551594 | |
| DATED | : April 13, 2010 | |
| INVENTOR(S) | : Patrice Jannic | |

It is certified that error appears in the above-identified patent and that said Letters Patent is hereby corrected as shown below:

Title page,
Item [74], *Attorney, Agent, or Firm*, delete "Harris;" and insert --Harts;-- therefor.

Column 1,
Line 38, delete "metalized" and insert --metallized-- therefor.

Column 3,
Line 31, delete "Iserlohn-Lethmathe," and insert --Iserlohn-Letmathe,-- therefor.

Column 11,
Lines 4-5, in Claim 4, delete "crossliniking" and insert --crosslinking-- therefor.

Column 11,
Line 7, in Claim 5, delete "crossliniking" and insert --crosslinking-- therefor.

Column 11,
Line 11, in Claim 6, "crossliniking" and insert --crosslinking-- therefor.

Column 11,
Line 12, in Claim 6, "crossliniking" and insert --crosslinking-- therefor.

Column 11,
Line 14, in Claim 6, delete "crossliniking" and insert --crosslinking-- therefor.

Signed and Sealed this
Second Day of August, 2011

David J. Kappos
*Director of the United States Patent and Trademark Office*